(No Model.)

T. E. HALFORD & E. W. BECKINGSALE.
WASHER.

No. 386,198. Patented July 17, 1888.

Witnesses
Cecil Hammond
John Rogers.

Inventors.
Thomas Ernest Halford,
Edgar William Beckingsale.

UNITED STATES PATENT OFFICE.

THOMAS ERNEST HALFORD, OF BEDFORD PARK, AND EDGAR WILLIAM BECKINGSALE, OF GROVE PARK, COUNTY OF MIDDLESEX, ENGLAND.

WASHER.

SPECIFICATION forming part of Letters Patent No. 386,198, dated July 17, 1888.

Application filed November 1, 1887. Serial No. 254,021. (No model.)

*To all whom it may concern:*

Be it known that we, THOMAS ERNEST HALFORD and EDGAR WILLIAM BECKINGSALE, subjects of the Queen of Great Britain, residing, respectively, at 16 Addison Road, Bedford Park, and 1 Grove Park Terrace, Grove Park, both in the township of Chiswick, county of Middlesex, England, have invented new and useful improvements in washers applicable for the joints of tubes and fittings with a glass or other lining, of which the following is a specification.

Our invention relates to washers for making the joints of tubes and fittings with a glass or other lining; and it has been found that if the joint is made with a plain washer on screwing up the tubes and fittings to make the joint the horizontal pressure and torsion on the lining cause the said lining to fail by crushing, especially if the lining is made of glass.

The objects of this present invention are to provide a means whereby the lining of the tube or fitting is relieved from longitudinal thrust when the joint is made, and to make a hydraulic joint. These objects we attain by means of the washers shown in the accompanying drawings, in which—

Figure 1:
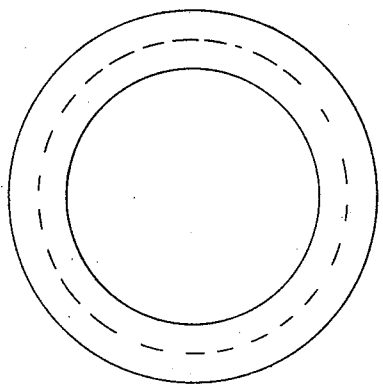
Figure 2:
Figure 3:
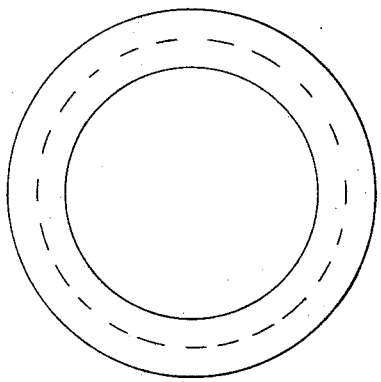
Figure 4:
Figure 5:
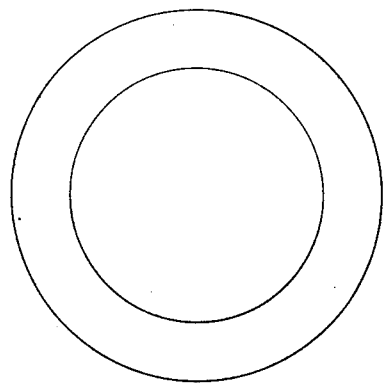
Figure 6:
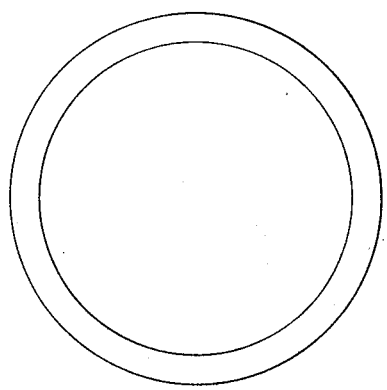

Figure 1 represents an elevation of our improved washer; Fig. 2, a section of the same; Fig. 3, a combination of two washers to effect the same purpose; Fig. 4, a section of the same; Figs. 5 and 6, an elevation of washers used in sets of three or more to effect our object, and Fig. 7 a section of the same.

Figure 7:

As shown in Figs. 1 and 2, we cut a groove, *a*, round the internal edge of the washer as deep or deeper than the thickness of the lining of the tube, so that when the joint is screwed up the washer bears only on the metal portion of the tube and the cement between the said metal and the lining. When, however, the tube is subjected to internal fluid pressure, the thin edges of the washer are expanded by the said pressure against the lining, making a hydraulic joint similar to that made by the cup-leather of a hydraulic press. Instead of this we may use two washers, recessed, as shown at *b*, Fig. 3, placed as shown in section at Fig. 4, or the combination of three or more washers, (shown at Figs. 5, 6, and 7,) the internal diameter of the middle washer or washers being greater than the internal diameter of the outer washers placed as shown in Fig. 7.

In conclusion, we would remark that we are aware of the English Patent No. 2,192, 1887, granted to Henry Dudley Cooper for washer for this purpose. Our washer is applicable also for electrical purposes.

What we claim, and desire to secure by Letters Patent of the United States, is—

1. In washers for the joints of tubes and fittings, with a glass or other lining, a washer having a groove, *a*, round its internal edge, substantially as shown, and for the purposes specified.

2. In washers for the joints of tubes and fittings, with a glass or other lining, the combination of two or more washers, recessed or plain, substantially as shown and described, for the purposes specified.

THOMAS ERNEST HALFORD.
EDGAR WILLIAM BECKINGSALE.

Witnesses:
  JOHN BATTARNS,
  CECIL HAMMOND.